United States Patent [19]

Krackeler et al.

[11] 3,956,567

[45] May 11, 1976

[54] INSULATED HIGH VOLTAGE WIRE COATED WITH A FLAME RETARDANT COMPOSITION AND PROCESS OF PREPARING THE SAME

[75] Inventors: Joseph J. Krackeler, Los Altos Hills; William G. Biddell, San Mateo, both of Calif.

[73] Assignee: National Distillers and Chemical Corporation, New York, N.Y.

[22] Filed: Jan. 30, 1975

[21] Appl. No.: 545,266

Related U.S. Application Data

[62] Division of Ser. No. 337,982, March 5, 1973.

[52] U.S. Cl. .............................. 428/379; 427/383; 427/388; 428/378; 428/380
[51] Int. Cl.² .................. B32B 15/00; B05D 3/02; D02G 3/00
[58] Field of Search ........... 428/364, 379, 380, 378; 260/897 A, 45.7 R, 45, 30.4 R; 427/383, 388; 264/171

[56] References Cited
UNITED STATES PATENTS

| | | | |
|---|---|---|---|
| 3,006,787 | 10/1961 | Blewis et al. | 428/379 |
| 3,231,636 | 1/1966 | Snyder et al. | 260/897 A |
| 3,375,303 | 3/1968 | Joyce | 260/897 A |
| 3,711,563 | 1/1973 | Carlson et al. | 260/45.7 R |

*Primary Examiner*—Lorraine T. Kendell
*Attorney, Agent, or Firm*—Kenneth D. Tremain

[57] ABSTRACT

A flame retardant composition formed by blending both low density polyethylene and high density polyethylene with a plurality of fire retardant additives comprising 1,2,3,4,6,7,8,9,10,10,11,11-dodecachloro-1,4,4a,5a,6,9,9a,9b-octahydro-1,4,6,9,dimethanodibenzofuran and 5-(tetrabromophenyl)-1,2,3,4,7,7,-hexachloronorbornene. The composition may contain antimony compounds as well as other conventional additives. By employing such compositions as insulation coatings for high voltage electrical wire or cable outstanding improvements are achieved in meeting stringent flammability and high voltage cut-through specifications.

7 Claims, No Drawings

INSULATED HIGH VOLTAGE WIRE COATED WITH A FLAME RETARDANT COMPOSITION AND PROCESS OF PREPARING THE SAME

This application is a divisional application of Ser. No. 337,982 filed Mar. 5, 1973.

The present invention relates to novel flame retardant polymeric compositions and their use in coating electrical wire or cable. More particularly, the invention pertains to polymer-based flame retardant compositions comprising both low and high density polyethylene blended with a plurality of fire retardant additives. Other aspects of the invention are concerned with the method of preparing the flame retardant compositions as well as to the method of utilizing said compositions in the coating of high voltage wire and cable.

In recent years the Underwriters' Laboratories, Inc. requirements for flame retardancy and capability of withstanding high voltage cut-through without breakdown have become more stringent for the insulation employed on high voltage wire. Insulated wire products have consisted of a primary insulation coating made of flame retarded polyethylene and a secondary insulation coating or outer jacket such as for example a polyvinyl chloride jacket. Although the outer jacket is chiefly responsible for meeting the flammability specifications, the use of a flame retarded polyethylene in the primary coating is also required to meet the current more stringent flame requirements. Insulated wire having a non-flame retarded primary insulation i.e. core, coating and a polyvinyl chloride outer jacket fails the flammability test.

High voltage, insulated wiring material is normally rated at 60°C. or 80°C., i.e., the insulation on the unshielded high voltage wire must satisfy the Underwriters' Laboratories flammability and high voltage cut-through specifications at these temperatures. However, until the present invention there was no polyethylene coated high voltage wire available which would permit a 90°C. and 105°C. rating. More specifically, the commercially available insulation constructions did not provide the requisite flame retardancy or high voltage cut-through resistance when tested for a period of seven hours while at 150 percent rated voltage and while being maintained at a temperature of 90°C. or 105°C. Studies have revealed that there were considerable differences between flame retardant polymeric compositions useful as primary insulation wire coatings that could pass an 80°C. high voltage cut-through test and flame retardant polymeric compositions that had to attain a 90°C. rating. Moreover, it proved quite difficult to achieve a 90°C. rating with polyethylene-based primary insulation coatings.

In accordance with the present invention it was found that the use of a particular polymer system combined with a particular fire retardant system results in the formation of a flame retardant polymeric composition that, when used as a primary insulation coating on high voltage wire or cable, enables the finished product to pass both the flammability test and the high voltage cut-through test at 90°C. and 105°C. in 20KV, 30KV, and 40KV size constructions.

The polymeric component is a combination of low density and high density polyethylene. In general, the amount of the polymeric component will range from about 45 to 85%, preferably 55 to 75% by weight, based on the total weight of the flame retarded polymeric composition. Although the relative amounts of the low density and high density polyethylene employed in the formulation may vary widely, major amounts of the low density polyethylene and minor amounts of the high density polyethylene will preferably be utilized. More particularly, the amount of the low density polyethylene will range from about 40 to 85%, preferably from about 60 to 75% while the amount of the high density polyethylene will range from about 15 to 60%, preferably from about 25 to 40%. The foregoing percentages are based on the total weight of the polymer component.

If the high density polyethylene is omitted from the formulation, the resulting wire coating will not meet the 90°C. and 105°C. tests for 20KV wire constructions, although it will meet the test for 40KV wire construction. On the other hand, when the low density polyethylene is omitted from the formulation, the high voltage cut-through test will not be met at either temperature. When the formulation contains only high density polyethylene, it is difficult to extrude the resulting polymeric composition onto wire without creating voids. The existence of such voids makes it impossible for the finished wire product to pass the high voltage cut-through test due to high voltage breakdown initiated at these void sites.

The suitable low density polyethylene will have a density within the range of 0.915 to 0.935 grams/cc. Thus, for example, low density polyethylene (0.92 gm/cc) may be produced by the polymerization of ethylene at a pressure greater than 1200 atmospheres and at a temperature of 100° to 300°C. Lower pressures of about 500 atmospheres can be used if a catalyst such as oxygen or benzoyl peroxide is added to the ethylene as described by Fawcett et al., Chemical Abstracts, 32,1362 (1938). Such a low density polyethylene is sold under the tradename DFD-6005 by Union Carbide Corporation and has a melt index of 0.2 grams/10 minutes and a 0.92 gm/cc density.

The high density, linear polyethylene will have a density within the range of from about 0.950 to 0.965 gm/cc. Such a high density polyethylene having a melt index of 0.15 and a density of 0.96 is sold under the tradename Fortiflex A6015 by the Celanese Corporation. High density polyethylenes are generally produced by utilizing organometallic catalysts and supported metal oxide catalysts as discussed in "Linear and Stereoregular Addition Polymers: Polymerization with Controlled Propagation" by N. G. Gaylord and H. F. Mark, published by Interscience Publishers, Inc. (1959).

The principle fire retardant additives utilized in forming the flame retardant polymeric compositions of this invention are:

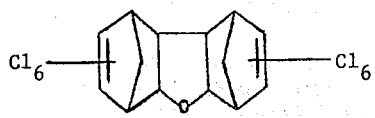

1,2,3,4,6,7,8,9,10,10,11,11-dodecachloro-1,4,4a,5a,6,9,9a,9b-octahydro-1,4,6,9, -dimethanodibenzofuran;

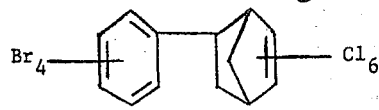 5-(tetrabromophenyl) -1,2,3,4, 7,7 -hexachloro-norbornene;

These compounds are currently sold under the trademarks Dechlorane 602 and Dechlorane 604, respectively. For the purposes of convenience, these compounds will be referred to hereinafter under their trademarks or as dibenzofuran and hexachloro-norbornene. The Dechlorane 602 and 604 are employed in amounts ranging from about 2 to 20% by weight and 2 to 30% by weight, respectively, and in a parts by weight ratio of 1/1 to 1/1.86, respectively. Most preferably substantially equal amounts of these particular fire retardant additives are utilized in the present formulations. It was found that the use of either additive alone failed to provide the properties essential for meeting the flammability and the high voltage cut-through tests.

For most purposes it is also desirable to incorporate an antimony compound into the formulation. Antimony trioxide is the antimony compound that is preferred for use in the present invention. However, many other antimony compounds are suitable. Suitable inorganic antimony compounds include antimony sulfide, sodium antimonite, potassium antimonate, and the like. Many organic antimony compounds are also suitable such as the antimony salts of organic acids and their pentavalent derivatives, disclosed in U.S. Pat. No. 2,996,528. Compounds of this class include antimony butyrate, antimony valerate, antimony caproate, antimony heptylate, antimony caprylate, antimony pelargonate, antimony caprate, antimony cinnamate, antimony anisate and their pentavalent dihalide derivatives disclosed in U.S. Pat. No. 2,993,924 may also be utilized.

The antimony additive will generally be employed in amounts ranging from about 10 to 40, preferably 15 to 30% be weight, based on the total weight of the total composition. It will be understood, however, that the amount of the antimony compound need only be sufficient to enhance the flame retardancy characteristics of the polymeric compositions.

Minor amounts of other additives may also be employed. Conventional antioxidants such as hindered phenols; 2,6 -dibutylphenol, dilaurylthiodiproprionate, and the like are often utilized in flame retarded polymeric compositions. Other ingredients that may be included are plasticizers, dyes, pigments, heat and light stabilizers, antistatic agents, and the like.

The Underwriters' Laboratories flammability test, designated as Subject 492, provides that a vertical specimen of the finished wire or cable shall flame no longer than one minuute following five 15-second applications of flame, the period between applications being 15 seconds. The specimen shall also not convey flame during, between, or after the five applications of flame.

The Underwriters' Laboratories high voltage cut-through test, designated as Subject 758, Paragraph 33, provides that the insulation on the unshielded high voltage wire or cable shall be capable of withstanding high voltage cut-through without breakdown for a period of 7 hours in an oven at the rated temperature, for example, 90°C., and while at 150 percent rate.

The aforementioned tests are known to the art and fully described in the official literature provided by the Underwriters' Laboratories, Inc.

As previously described, the flame retardant polymeric compositions of this invention are particularly suitable as coatings for high voltage wire or cable used in television receivers, street lighting, signal controls, neon signs, and the like. The wire constructions may range from 20 to 40KV. The polymeric compositions are mainly utilized as the primary or core coating (15 to 50 mils) for the wire or cable, although it may also constitute the sole coating with an appropriate adjustment in thickness. The secondary or outer coating, when employed, may comprise polyvinyl chloride or other conventional outer coatings known to the art such as chlorinated polyethylene, silicone, neoprene, chlorinated wax, polyvinylidene fluoride, and the like. The outer coatings will generally vary in thickness from about 15 to 30 mils.

In accordance with another feature of this invention it has been found essential to subject the flame retardant polymeric compositions to an elevated temperature that is at least equal to the melting point of the Dechlorane 604 or hexachloro-norbornene additive. The temperature will be above about 355°F and preferably within the range of from about 360° to 400°F. This heat treatment can be accomplished either during preparation of the flame retardant polymeric composition or during the extrusion of the polymeric composition onto the wire. For the purpose of insuring that this treatment is achieved, two heating steps may be utilized. Thus, for example, the polymeric composition may be heated during the conventional pelletizing step to the requisite elevated temperature, and then subjected to the same elevated temperatures during the extrusion step. It will be understood, however, that only one heat treatment is required, and that the choice of when to carry it out will depend merely on the basis of convenience. The heating is sufficient if carried out for a relatively short period of time such as 15 to 60 seconds. Reasonably longer heating periods can be employed without encountering deleterious effects.

The invention will be more fully understood by reference to the following specific embodiments which are not to be construed as limiting the scope of the invention but are only for purposes of illustration.

EXAMPLE I

The following runs were carried out with 22 AWG wire using a 0.050 inch primary insulation coating with a 0.020 inch polyvinyl chloride jacket, to produce a 40KV construction. The formulations of the primary insulation, expressed in parts by weight, and the test results are set forth in the following table:

TABLE A

|  | RUNS | | | | |
|---|---|---|---|---|---|
|  | 1 | 2 | 3 | 4 | 5 |
| DFD 6005 (LDPE) | 53.5 | 53.5 | 53.5 | 53.5 | 53.5 |
| Fortiflex A6015 (HDPE) | 21.5 | 21.5 | 21.5 | 21.5 | 21.5 |
| Dechlorane 602 | — | — | 10 | 7.5 | 5.0 |

TABLE A-continued

|  | RUNS | | | | |
| --- | --- | --- | --- | --- | --- |
|  | 1 | 2 | 3 | 4 | 5 |
| Dechlorane 604 | 10 | 10 | — | 2.5 | 5.0 |
| $Sb_2O_3$ | 15 | 15 | 15 | 15 | 15 |
| Process Temperature, °F | 380 | 350 | 380 | 380 | 380 |
| High Voltage Cut-through Test U/L Subject 758, 90°C. | Pass | Fail | Fail | Fail | Pass |
| Vertical Flammability Test U/L Subject 492 | Partial Pass | Partial Pass | Pass | Pass | Pass |

Runs 1 and 2 have identical primary insulation formulations. In Run 2, the temperature during preparation and extrusion was kept below 350°F. thereby preventing the Dechlorane 604 from melting. The resulting coated wire failed the high voltage cut-through tet. Run 1, on the other hand, was subjected to temperatures up to 380°F. during extrusion and the resulting coated wire passed the high voltage cut-through test. Run 3 shows that when Dechlorane 602 (non-melting at the processing temperatures) is used alone the coated wire failed the high voltage cut-through test. When excessive amounts of Dechlorane 602 are employed as in Run 4 (a 3:1 ratio of Dechloranes 602/604) the coated wire also failed the high voltage cut-through test. Run 5 shows that the use of identical amounts of Dechlorane 602 and 604 and the use of a processing temperature of 380°F. during extrusion produces the desired results.

EXAMPLE 2

The following runs were carried out with 22 AWG wire using a 0.025 inch primary insulation coating with a 0.020 inch polyvinyl chloride jacket to produce a 20KV construction. The formulations of the primary insulation, expressed in parts by weight, and the test results are set forth in the following table:

TABLE B

|  | RUNS | | | | |
| --- | --- | --- | --- | --- | --- |
|  | 6 | 7 | 8 | 9 | 10 |
| DFD 6005 (LDPE) | 70.0 | 70.0 | 50 | 50 | 53.5 |
| Fortiflex A6015 (HDPE) | — | — | 20 | 20 | 21.5 |
| Dechlorane 602 | — | 15 | 10 | — | 5 |
| Dechlorane 604 | 15 | — | — | 15 | 5 |
| $Sb_2O_3$ | 15 | 15 | 15 | 15 | 15 |
| High Voltage Cut-through Test U/L Subject 758, 90°C. | Fail | Fail | Pass | Pass | Pass |
| Process Temperature, °F. | 380 | 380 | 380 | 380 | 380 |
| Vertical Flammability Test U/L Subject 492 | Partial Pass | Pass | Pass | Partial Pass | Pass |

The above data show that the factors which enable a given formulation to pass the high voltage cut-through test in the 20KV size construction differ from those for the 40KV size construction. For the 20KV size the polymer system is more critical than the fire retardant system in this test. Runs 6 and 7 have different fire retardant systems and do not contain any high density polyethylene, consequently they failed the high voltage cut-through test. Runs 8, 9 and 10 contain the high density polyethylene blended with the low density polyethylene, and the resulting coated wires passed the high voltage cut-through test. The data illustrate quite dramatically that without the high density polyethylene being incorporated into the primary coating formulation the coated wire fails the high voltage cut-through test at 90°C. Since it is desirable to have one formulation that will pass the tests in both 20KV and 40KV size constructions, it is essential that both the proper balance of fire retardants and polymers be used. As shown, the desired results are readily achieved when a blend of high density polyethylene and low density polyethylene is used in conjunction with both Dechlorane 602 and Dechlorane 604 as fire retardants.

EXAMPLE 3

Excellent flammability and high voltage cut-through properties were also achieved with the formulations, expressed in parts by weight, set forth in the following table:

TABLE C

|  | RUNS | |
| --- | --- | --- |
|  | 11 | 12 |
| DFD 6005 (LDPE) | 54.7 | 33.7 |
| Fortiflex A6015 (HDPE) | 20 | 20 |
| Dechlorane 602 | 5 | 7 |
| Dechlorane 604 | 5 | 13 |
| $Sb_2O_3$ | 15 | 25 |
| Santanox R* | 0.3 | 0.3 |

*Antioxidant- 4,4'-Thiobis (6-Tertiary butyl-m-cresol)

The formulation of Run 12 can be employed as a wire coating without the typical outer coating or jacket and still meet the flammability and high voltage cut-through requirements.

In Table D typical physical properties and flammability test results are set forth for the formulation of Run 11.

TABLE D

| PHYSICAL PROPERTIES | UNITS | VALUE | TEST METHOD |
| --- | --- | --- | --- |
| Density | g/cc | 1.14 | ASTM D793 |
| Melt Index | g/10 min | 1.0 | ASTM D1238 |
| Tensile Strength | psi | 2300 | ASTM D638 |

TABLE D-continued

| PHYSICAL PROPERTIES | UNITS | VALUE | TEST METHOD |
|---|---|---|---|
| Ultimate Elongation | % | 400 | ASTM D638 |
| Secant Modulus at 1% Strain | psi | $2.1 \times 10^4$ | ASTM D882 |
| Hardness | Shore D | 50 | ASTM D1706 |
| Cold Temperature Impact | °F | −60 | ASTM D746 |
| Water Absorption | % | .01 | ASTM D570 |
| Vicat Softening Temperatures | °F | 195 | ASTM D1525 |

| FLAMMABILITY | RATING |
|---|---|
| ASTM D635, .125 in. | Self-extinguishing, nondripping |
| U/L Subject 94, .125 inch | SE-1 nondripping |
| U/L Subjects 492 and 758, vertical flame test per U/L Style 3239 | Self-extinguishing |

While particular embodiments of the present invention have been set forth above, it will be understood that the invention is obviously subject to modifications and variations without departing from its broader aspects.

What is claimed is:

1. A process for coating electrical wire which comprises extruding onto said wire a flame retardant polymeric composition comprising the following ingredients:
   a. about 45 to 85% of polymeric components comprising about 15 to 60% high density polyethylene and about 40 to 85% low density polyethylene;
   b. fire retardant components comprising about 2 to 20% by weight 1,2,3,4,6,7,8,9,10,10,11,11,-dodecachloro-1,4,4a,5a,6,9,9a, 9b-octahydro-1,4,6,9-dimethanodibenzofuran and about 2 to 30% by weight 5-(tetrabromophenyl)-1,2,3,4,7,7-hexachloro-norbornene in a parts by weight ratio of 1/1 to 1/1.86, respectively; and
   c. about 10 to 40% by weight of an antimony compound; wherein said polymeric composition is subjected during extrusion to a temperature at least above the melting point of the 5-(tetrabromophenyl)-1,2,3,4,7,7-hexachloro-norbornene.

2. In the process of claim 1 wherein said polymeric composition is subjected during extrusion to a temperature within the range of about 360° to 400°F.

3. In the process of claim 1 wherein an outer coating is extruded onto said wire.

4. In the process of claim 3 wherein said outer coating comprises polyvinyl chloride.

5. An insulated high voltage wire coated with a flame retarded polymeric composition comprising
   a. about 45 to 85% of polymeric components comprising about 15 to 60% high density polyethylene and about 40 to 85% low density polyethylene;
   b. fire retardant components comprising about 2 to 30% by weight 1,2,3,4,6,7,8,9,10,10,11,11-dodecachloro-1,4,4a,5a,6,9,9a,9b-octahydro-1,4,6,9,-dimethanodibenzofuran and about 2 to 30% by weight 5-(tetrabromophenyl)-1,2,3,4,7,7,-hexachloro-norbornene in a parts by weight ratio of 1/1 to 1/1.86, respectively; and
   c. about 10 to 40% by weight of an antimony compound.

6. The insulated high voltage wire of claim 5 wherein an outer coating is applied, said outer coating comprising a flame resistant polymeric material.

7. The insulated high voltage wire of claim 6 wherein said outer coating comprises polyvinyl chloride.

* * * * *